United States Patent
Klein et al.

(10) Patent No.: US 11,724,733 B2
(45) Date of Patent: Aug. 15, 2023

(54) TORQUE-BASED DIRECTIONAL CONTROL IN STEER-BY-WIRE STEERING SYSTEMS

(71) Applicant: STEERING SOLUTIONS IP HOLDING CORPORATION, Saginaw, MI (US)

(72) Inventors: Steven D. Klein, Mungar, MI (US); Michael K. Hales, Midland, MI (US); Nicholas M. Trewhella, Sanford, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 232 days.

(21) Appl. No.: 17/029,657

(22) Filed: Sep. 23, 2020

(65) Prior Publication Data

US 2022/0089212 A1     Mar. 24, 2022

(51) Int. Cl.
*B62D 5/04* (2006.01)
*B62D 6/00* (2006.01)

(52) U.S. Cl.
CPC ............. *B62D 5/0463* (2013.01); *B62D 6/00* (2013.01)

(58) Field of Classification Search
CPC ........ B62D 5/0463; B62D 6/00; B62D 5/003; B62D 5/006; B62D 6/008; B62D 6/002
See application file for complete search history.

(56) References Cited

U.S. PATENT DOCUMENTS

| | | | | |
|---|---|---|---|---|
| 7,726,439 B2 * | 6/2010 | Akuta | ...................... | B62D 6/02 180/405 |
| 2005/0082108 A1 * | 4/2005 | Husain | ................... | B62D 5/003 180/402 |
| 2008/0053740 A1 * | 3/2008 | Hublart | ................... | B62D 3/14 180/443 |

(Continued)

FOREIGN PATENT DOCUMENTS

| | | | | |
|---|---|---|---|---|
| DE | 102018212804 A1 * | 2/2020 | | |
| EP | 2090477 A1 * | 8/2009 | ............ | B60R 21/05 |

(Continued)

OTHER PUBLICATIONS

JP-2010280312-A translation (Year: 2010).*
WO-2005005230-A1 translation (Year: 2005).*
DE-102018212804-A1 translation (Year: 2020).*

*Primary Examiner* — Jeff A Burke
*Assistant Examiner* — Kyle T Johnson
(74) *Attorney, Agent, or Firm* — Dickinson Wright PLLC

(57) ABSTRACT

A vehicle steering control method includes receiving a sensed handwheel angle corresponding to a position of a handwheel and receiving a sensed handwheel toque value indicating an amount of torque applied by an operator on the handwheel. The method also includes, in response to a determination that the handwheel motor is in an unlocked condition, generating a roadwheel angle based on the sensed handwheel angle and a vehicle speed. The method also includes, in response to a determination that the handwheel motor is in a locked condition generating the roadwheel (Continued)

angle based on the sensed handwheel torque value and the vehicle speed and, in response to a determination that the locked condition of the handwheel motor is an intermittent condition, maintaining the handwheel motor in the locked condition.

9 Claims, 6 Drawing Sheets

(56) References Cited

U.S. PATENT DOCUMENTS

| | | | |
|---|---|---|---|
| 2010/0057291 A1* | 3/2010 | Bohm | B62D 7/1581 701/41 |
| 2013/0024072 A1* | 1/2013 | Michelis | B62D 15/0235 701/42 |
| 2016/0272197 A1* | 9/2016 | Hulten | B60W 30/02 |
| 2018/0079447 A1* | 3/2018 | Yamashita | B62D 5/0469 |
| 2019/0092376 A1* | 3/2019 | Panse | B60R 25/02 |
| 2019/0126971 A1* | 5/2019 | Kim | B62D 5/006 |
| 2019/0389503 A1* | 12/2019 | Hwang | B62D 5/001 |
| 2020/0307675 A1* | 10/2020 | Yamashita | B62D 5/006 |
| 2021/0354750 A1* | 11/2021 | Kim | B62D 5/0472 |
| 2021/0371008 A1* | 12/2021 | Hwang | B62D 6/008 |

FOREIGN PATENT DOCUMENTS

| | | | | |
|---|---|---|---|---|
| JP | 2010280312 A | * | 12/2010 | |
| WO | WO-2005005230 A1 | * | 1/2005 | B62D 1/184 |

* cited by examiner

TORQUE-BASED DIRECTIONAL CONTROL IN STEER-BY-WIRE STEERING SYSTEMS

BACKGROUND OF THE INVENTION

This application generally relates to electric power steering (EPS) system, and particularly to providing a torque-based directional control in steer-by-wire steering systems.

Vehicles use a steering system to control the direction of travel. Typically, mechanical steering systems are used that may include a mechanical linkage or a mechanical connection between a handwheel (steering wheel) and the vehicle's roadwheels. The movement of the handwheel causes corresponding movement of the roadwheels. Movement of such mechanical systems is often power assisted through the use of hydraulic assists or electric motors.

For various reasons, such as to improve fuel economy, increase vehicle modularity, reduce load on the engine of the vehicle, reduce vehicle weight, provide four-wheel-steering, and the like, instead of mechanical steering systems vehicles are being equipped with electrically driven steering systems, commonly known as "steer-by-wire" steering systems. Such steer-by-wire systems to varying extents replace, for example, the mechanical linkage between the steering wheel and the vehicle wheels with an electrically assisted actuator.

Accordingly, it is desirable to have a robust failure mode mitigated steer-by-wire steering systems equipped in vehicles.

SUMMARY OF THE INVENTION

An aspect of the disclosed embodiments includes a system for vehicle steering control. The system includes a processor and a memory. The memory includes instructions that, when executed by the processor, cause the processor to: receive a sensed handwheel angle corresponding to a position of a handwheel; receive a sensed handwheel toque value indicating an amount of torque applied by an operator on the handwheel; in response to a determination that the handwheel motor is in an unlocked condition, generate a roadwheel angle based on the sensed handwheel angle and a vehicle speed; and in response to a determination that the handwheel motor is in a locked condition: generate the roadwheel angle based on the sensed handwheel torque value and the vehicle speed; and, in response to a determination that the locked condition of the handwheel motor is an intermittent condition, maintain the handwheel motor in the locked condition.

Another aspect of the disclosed embodiments includes a vehicle steering control method. The method includes receiving a sensed handwheel angle corresponding to a position of a handwheel and receiving a sensed handwheel toque value indicating an amount of torque applied by an operator on the handwheel. The method also includes, in response to a determination that the handwheel motor is in an unlocked condition, generating a roadwheel angle based on the sensed handwheel angle and a vehicle speed. The method also includes, in response to a determination that the handwheel motor is in a locked condition generating the roadwheel angle based on the sensed handwheel torque value and the vehicle speed and, in response to a determination that the locked condition of the handwheel motor is an intermittent condition, maintaining the handwheel motor in the locked condition.

Another aspect of the disclosed embodiments includes an apparatus for vehicle steering control. The apparatus includes a processor and a memory. The method includes instructions that, when executed by the processor, cause the processor to: receive a vehicle speed; receive a sensed handwheel toque value indicating an amount of torque applied by an operator on a handwheel; and, in response to a determination that a handwheel motor associated with the handwheel is in a locked condition, generate a roadwheel angle based on the sensed handwheel torque value and the vehicle speed and, in response to a determination that the locked condition of the handwheel motor is an intermittent condition, maintain the handwheel motor in the locked condition.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
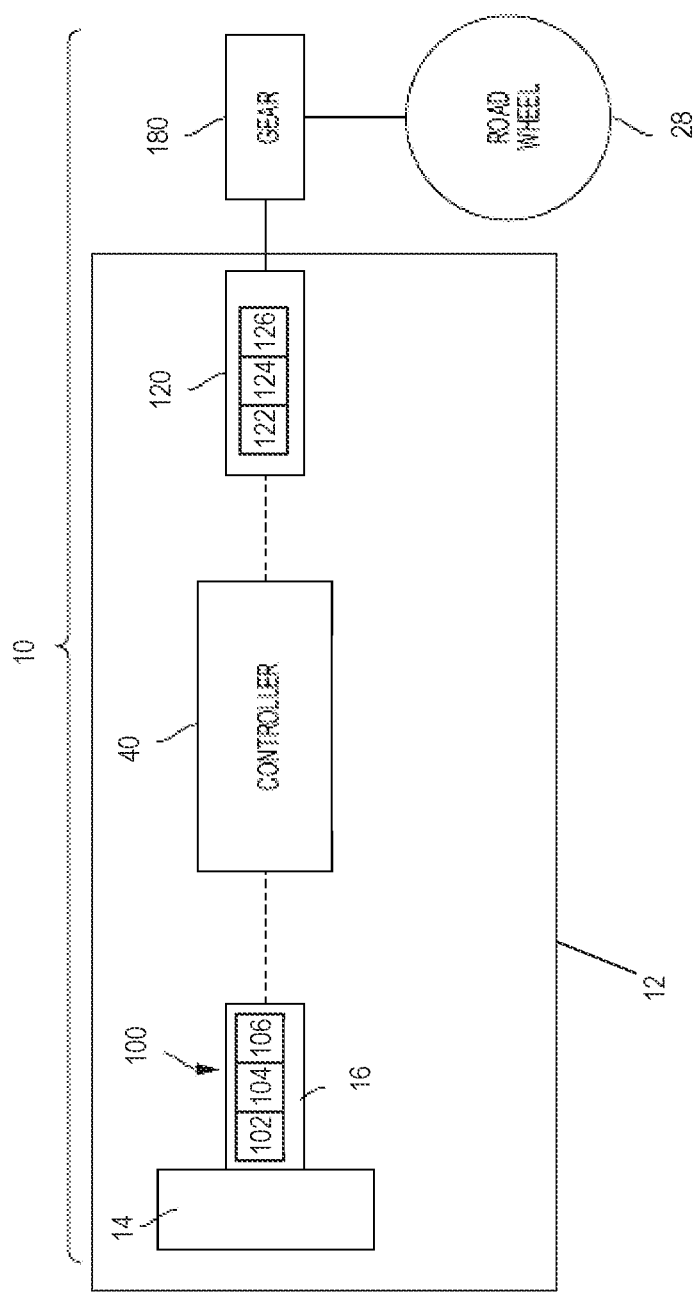
FIG. 1 generally illustrates a block diagram of a vehicle equipped with a steer by wire steering system according to one or more embodiments.

Referring now to the Figures, where the invention will be described with reference to specific embodiments, without limiting same, FIG. 1 is an exemplary embodiment of a steer by wire (SBW) type steering system 12 that does not include any mechanical linkages between a handwheel 14 (e.g., which may be referred to as a steering wheel) and roadwheels 28. The mechanical linkages are replaced with sensors, actuators, and electronics. For example, in a conventional steering system, which includes a steering wheel, a steering column, a power assisted rack and pinion system, and tie rods, the driver turns the steering wheel which, through the various mechanical components, causes the roadwheels of the vehicle to turn. In the steer by wire system 12, a number of the mechanical components between the steering wheel and the roadwheels of the vehicle are replaced with a sensor at the steering wheel and both sensors and actuators at the roadwheels, and the rotation of the steering wheel is measured by the sensor. This rotation measurement is processed by the electronics to generate command signals for the actuators to turn the roadwheels. Driver feedback in the form of steering torque that is designed to represent the feel of the road is provided by torque and rotation servo-actuators with software that provide simulation of driving conditions for the driver.

FIG. 1 generally illustrates a block diagram of a vehicle 10 equipped with the steer by wire type steering system 12 according to one or more embodiments. The vehicle 10 may be an autonomous or semi-autonomous vehicle having a steer by wire system.

The steer by wire system 12 includes a handwheel actuator 100 (e.g., which may be referred to as a handwheel motor or handwheel actuator motor) and a roadwheel actuator 120 that are only connected electronically (i.e., there is no mechanical connection between the handwheel and the roadwheels.) In this set up the key functions of the handwheel actuators 100 are to measure the steering angle applied by a driver via the handwheel 14 and provide torque feedback to the driver that is representative of the torque a driver would feel while driving the vehicle 10 with a typical mechanical steering system. To accomplish these objectives, the handwheel actuator 100 is typically equipped with a torque sensor 102, a handwheel position sensor 104, and an electronic motor 106. In one or more examples, the system 12 may include, among other components, a servo actuator coupled to a steering column 16 and handwheel 14 to simulate the driver's feel of the road. The steering system 12 may apply tactile feedback in the form of torque to the handwheel 14 and are coupled to the handwheel 14 and/or the steering column 16. It should be noted that in one or more examples, the steering system 12 may provide the tactile feedback using any other components in lieu of another servo actuator coupled to the steering column 16 and handwheel 14 to provide tactile feedback in the form of torque to the handwheel 14 to simulate the driver's feel of the road.

The primary function of the roadwheel actuator 120 is to track the desired roadwheel angle. To accomplish this objective, the roadwheel actuator 120 is typically equipped with, among other components, a position sensor 122, and a motor 124.

As described earlier, the vehicle 10 does not include a mechanical connection between the handwheel 14 and a steering gear 180, such as electric power steering gear, which is operatively coupled to a plurality of roadwheels 28. However, the handwheel 14 and steering gear 180 are electrically coupled. Guidance of the vehicle 10 is performed by use of the steering gear 180, with an input shaft that is rotated by the actuator 120, such as a servo actuator.

The steer by wire system 12 further includes a controller 40 that performs one or more computations. For example, the controller 40 computes a desired roadwheel angle based on the measured steering angle, but may also depend on other signals such as vehicle speed. The controller may perform various other computations described herein. Aspects of embodiments described herein may be performed by any suitable control system and/or processing device, such as the controller 40. The controller 40 may be an ECU.

The vehicle 10 includes additional ECUs. The controller 40 receives information from the other ECUs, such as the vehicle speed signal, the sensor information, and various other information. There are multiple communication methods designed for inter-micro communication, such as the protocols SCI, CAN, and MLI, among others. Each protocol may satisfy a portion of the safety aspects of data handling, but does not inherently ensure that all safety aspects are covered. In one or more examples, the controller 40 is an ECU operated by a real time operating system (RTOS).

Further, in one or more examples, the controller 40, irrespective of the depiction in FIG. 1, may include a distributed computing module that includes a first controller in the handwheel actuator 100 and a second controller as part of the roadwheel actuator 120, and the like. Alternatively, or in addition, the controller 40 may include computing resources from other ECUs or control modules that are equipped in the vehicle 10.

One potential failure mode of the steer by wire system 12 occurs when the motor 106 in the handwheel actuator 100 is unable to spin, or is "locked up", preventing a driver from moving the handwheel 14. This failure mode, which is also possible in an electronic power steering (EPS) system, is a technical challenge that is to be addressed for safety of the driver and vehicle 10 because a locked up handwheel actuator prevents directional steering of the vehicle 10. The technical solutions described herein address such technical challenge and facilitate a steer by wire system 12 to provide steering directional control in the presence of a locked handwheel actuator.

Figure 2:
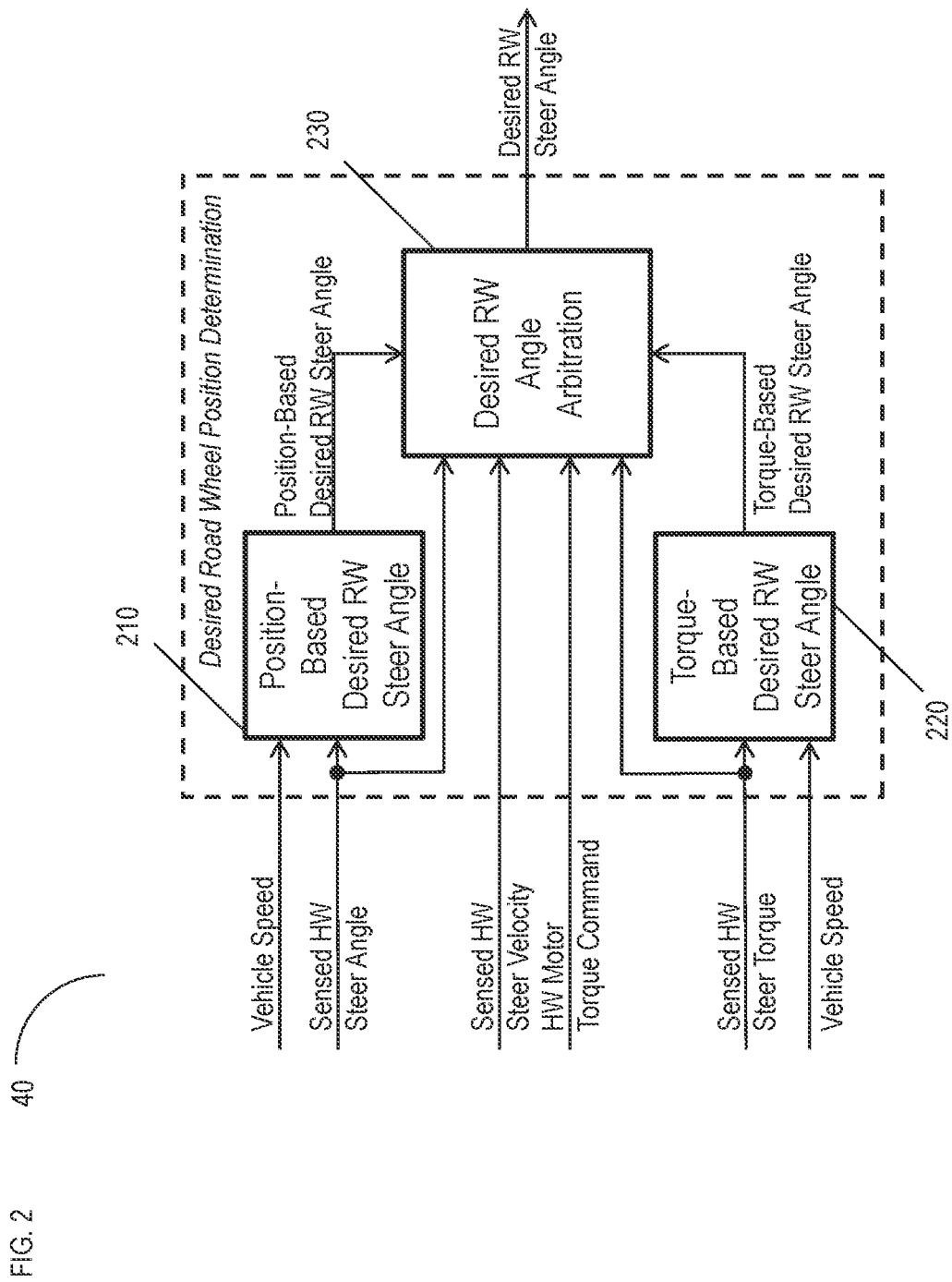
FIG. 2 generally illustrates a block diagram and operational flow for determining a desired position of a roadwheel actuator according to one or more embodiments.

FIG. 2 shows a block diagram and operational flow for determining a desired position of a roadwheel actuator according to one or more embodiments. In one or more examples, determining the desired position of the roadwheel actuator 120 is determining a roadwheel angle for the motor 124 of the roadwheel actuator 120. The roadwheel angle is determined by the controller 40. The controller 40 uses two methods for generating the desired roadwheel angle.

The first method is used in a non-failed state (i.e., the handwheel actuator motor 106 is not locked). In this case the desired roadwheel angle is determined as a function of the sensed handwheel angle. In one or more examples, the controller 40 includes a handwheel angle based roadwheel computation module 210 for executing the first method.

The second method is used when the handwheel actuator motor 106 is locked up. In this case the desired roadwheel angle is determined as a function of sensed torque applied by a driver to the handwheel 14, and sensed by the handwheel torque sensor 102. In one or more examples, the controller 40 includes a handwheel torque based roadwheel computation module 220 for executing the second method.

Further, the controller 40 includes an arbitration module 230. The arbitration module 230 selects which of the calculated desired roadwheel angles is used by the roadwheel actuator 120. For example, the roadwheel computation module 210 and the roadwheel computation module 220 both compute respective roadwheel angles based on the handwheel angle and the handwheel torque respectively. Based on whether the handwheel actuator motor 106 is locked or not, the arbitration module 230 selects which of the two to send to the roadwheel actuator 120 for adjusting the roadwheels 28. Alternatively, or in addition, the arbitration module 230 blends the two roadwheel angles computed by each roadwheel computation modules 210 and 220 and sends the blended result to the roadwheel actuator 120 for adjusting the roadwheels 28.

Figure 3:
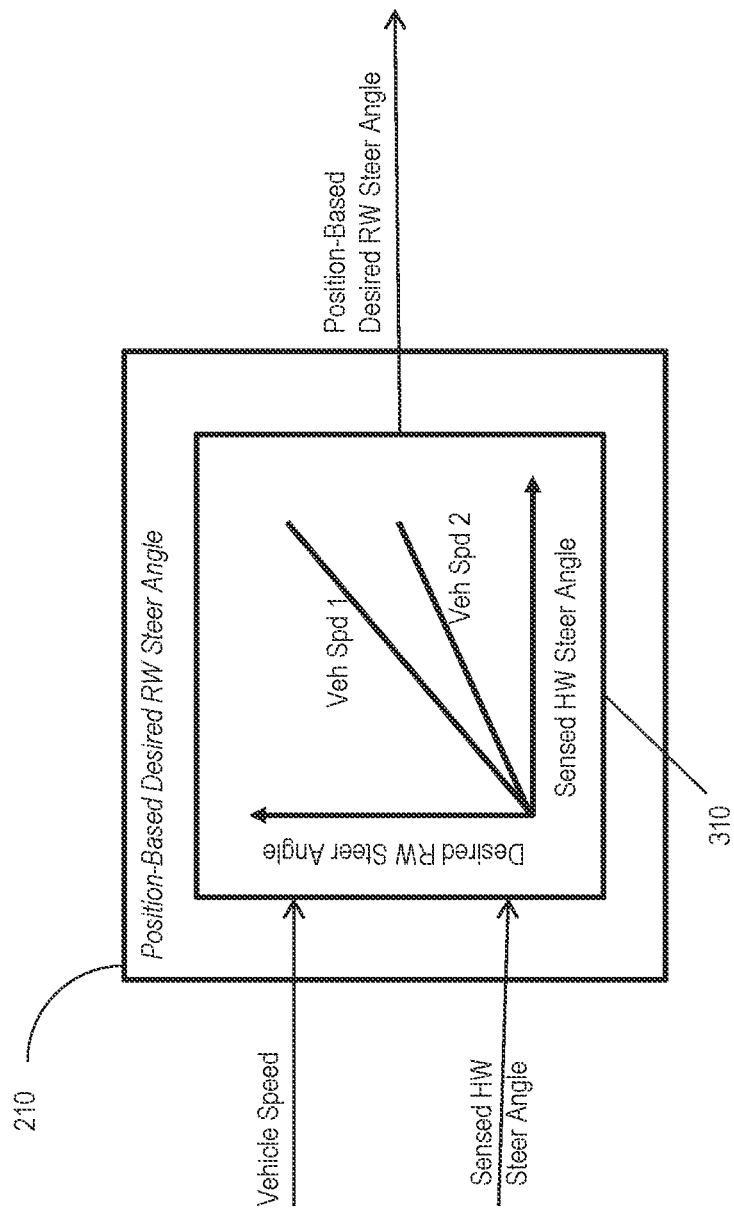
FIG. 3 generally illustrates a block diagram and operational flow of an example roadwheel computation module that computes the desired roadwheel position based on handwheel angle according to one or more embodiments.

FIG. 3 generally illustrates a block diagram and operational flow of an example roadwheel computation module that computes the desired roadwheel position based on handwheel angle according to one or more embodiments. In one or more examples, the roadwheel computation module 210 receives the handwheel angle from the position sensor 104 of the handwheel actuator 100. Further, the roadwheel computation module 210 receives a vehicle speed, for example from another ECU in the vehicle 10 or from one or more sensors. In one or more examples, the vehicle speed may be an estimated value that the roadwheel computation module 210 receives. In one or more examples, the roadwheel computation module 210 includes a lookup table 310. The lookup table 310 provides a desired roadwheel position based on the input values of the handwheel angle and the vehicle speed. In one or more examples, the lookup table 310 includes multiple tables for different vehicle speeds and/or different handwheel angles. Alternatively, the lookup table 310 includes a 2-dimensional lookup based on the two input values. In one or more examples, the lookup table 310 may use additional input values to determine the desired roadwheel angle. Further, in one or more examples, instead of using a lookup table, the desired roadwheel angle is computed by the roadwheel computation module 210 by using a predetermined formula that includes predetermined values along with the two or more input values including the sensed handwheel angle and the vehicle speed.

Figure 4:
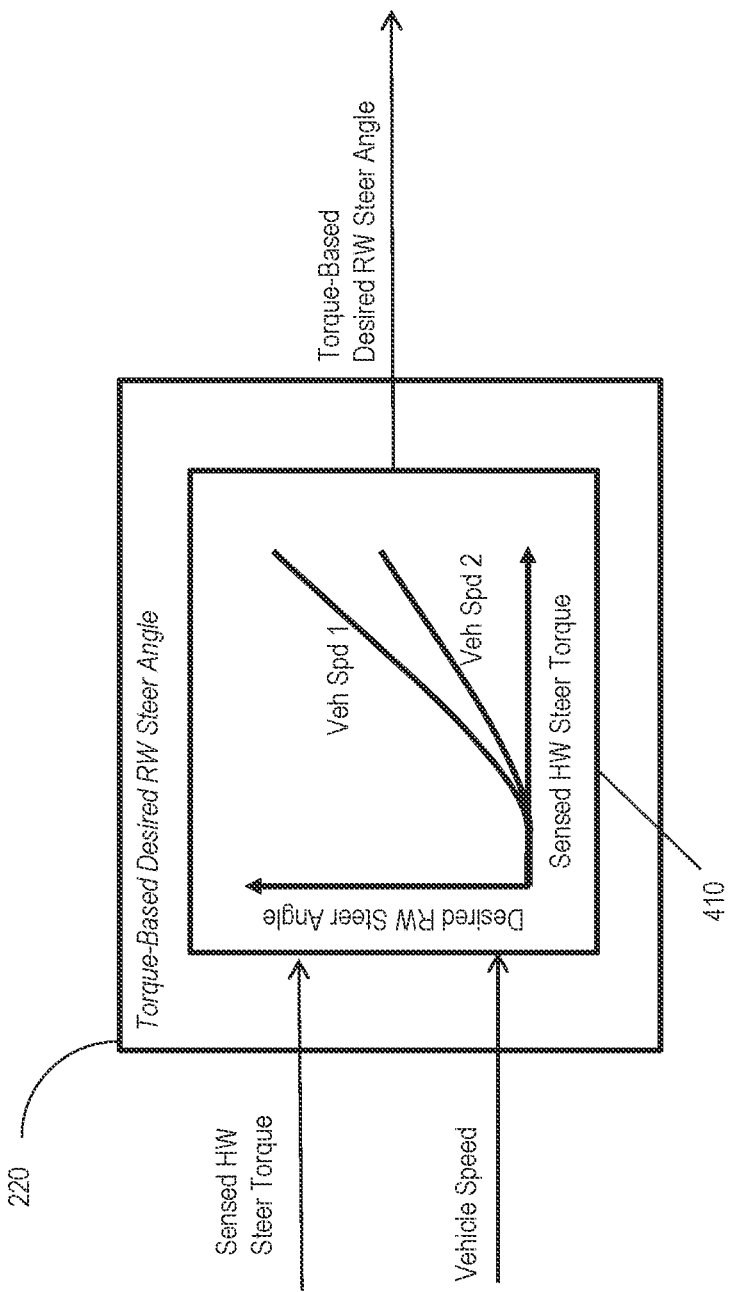
FIG. 4 generally illustrates a block diagram and operational flow of an example roadwheel computation module that computes the desired roadwheel position based on handwheel torque according to one or more embodiments.

FIG. 4 generally illustrates a block diagram and operational flow of an example roadwheel computation module that computes the desired roadwheel position based on handwheel torque according to one or more embodiments. In one or more examples, the roadwheel computation module 220 receives the handwheel torque from the handwheel torque sensor 102 of the handwheel actuator 100. Further, the roadwheel computation module 220 receives a vehicle speed, for example from another ECU in the vehicle 10 or from one or more sensors. In one or more examples, the vehicle speed may be an estimated value that the roadwheel computation module 220 receives. In one or more examples, the roadwheel computation module 220 includes a lookup table 410. The lookup table 410 provides a desired roadwheel position based on the input values of the handwheel torque and the vehicle speed. In one or more examples, the lookup table 410 includes multiple tables for different vehicle speeds and/or different handwheel torque values. Alternatively, the lookup table 410 includes a 2-dimensional lookup based on the two input values. In one or more examples, the lookup table 410 may use additional input values to determine the desired roadwheel angle. Further, in one or more examples, instead of using a lookup table, the desired roadwheel angle is computed by the roadwheel computation module 220 by using a predetermined formula that includes predetermined values along with the two or more input values including the sensed handwheel torque and the vehicle speed.

Figure 5:
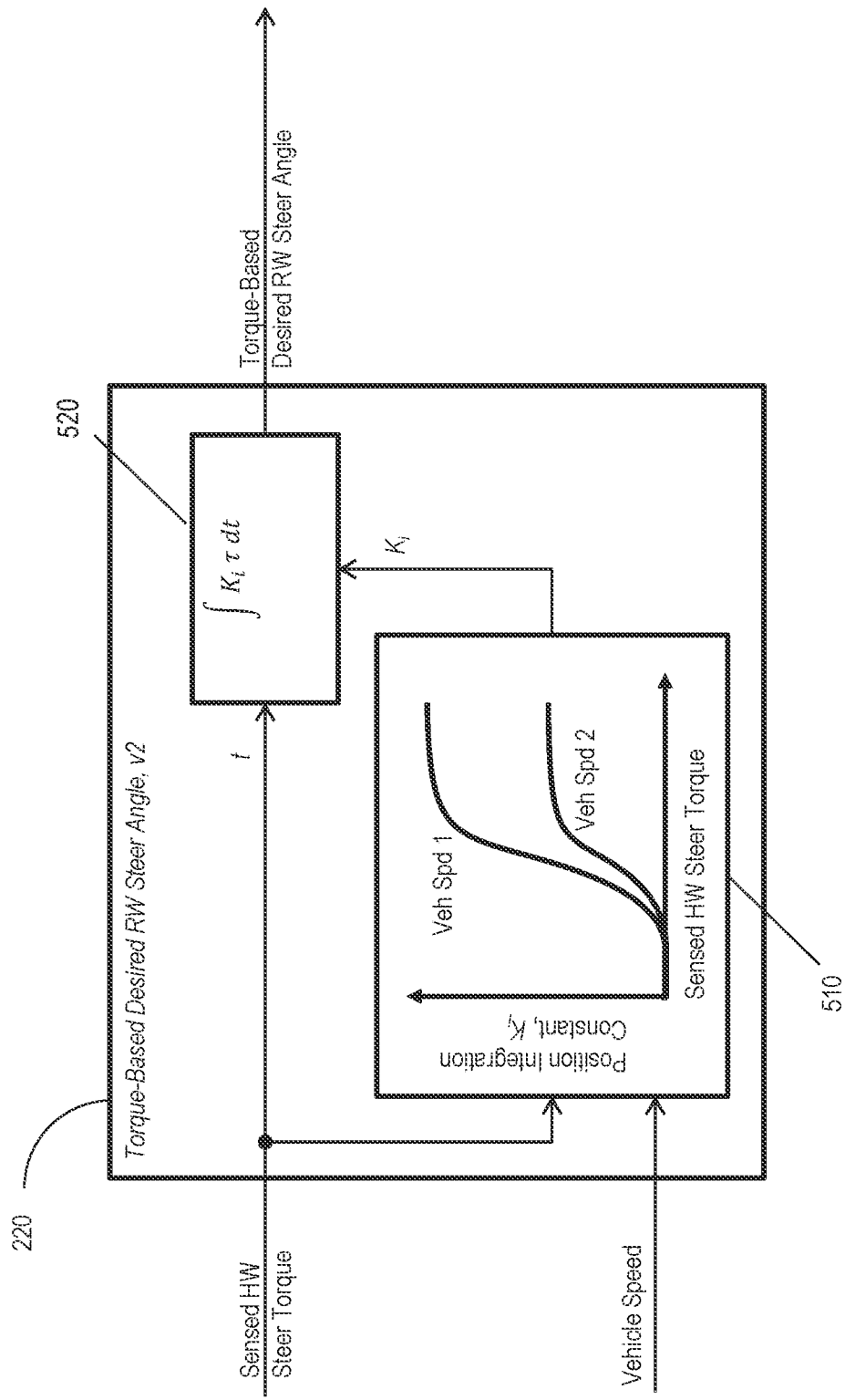
FIG. 5 generally illustrates another block diagram and operational flow of an example roadwheel computation module that computes the desired roadwheel position based on handwheel torque according to one or more embodiments.

FIG. 5 generally illustrates another block diagram and operational flow of an example roadwheel computation module that computes the desired roadwheel position based on handwheel torque according to one or more embodiments. In one or more examples, the roadwheel computation module 220 receives the handwheel torque from the handwheel torque sensor 102 of the handwheel actuator 100. Further, the roadwheel computation module 220 receives a vehicle speed, for example from another ECU in the vehicle 10 or from one or more sensors. In one or more examples, the vehicle speed may be an estimated value that the roadwheel computation module 220 receives.

In one or more examples, the roadwheel computation module 220 includes a lookup table 510. The lookup table 510 provides a position integration constant K based on the input values of the handwheel torque and the vehicle speed. In one or more examples, the lookup table 510 includes multiple tables for different vehicle speeds and/or different handwheel torque values. Alternatively, the lookup table 510 includes a 2-dimensional lookup based on the two input values. In one or more examples, the lookup table 510 may use additional input values to determine the position integration constant $K_i$.

The roadwheel computation module 220 further includes an integration module 520 that computes a continuous sum of a predetermined number of the sensed handwheel torque. The position integration constant $K_i$ is used by the integration module 520 when computing the continuous sum as a multiplication factor. For example, the integration module 520 computes $\int K_i \tau \, dt$, where $\tau$ is the sensed handwheel torque received as the input. The result is the desired roadwheel desired position output by the roadwheel computation module 220.

Figure 6:
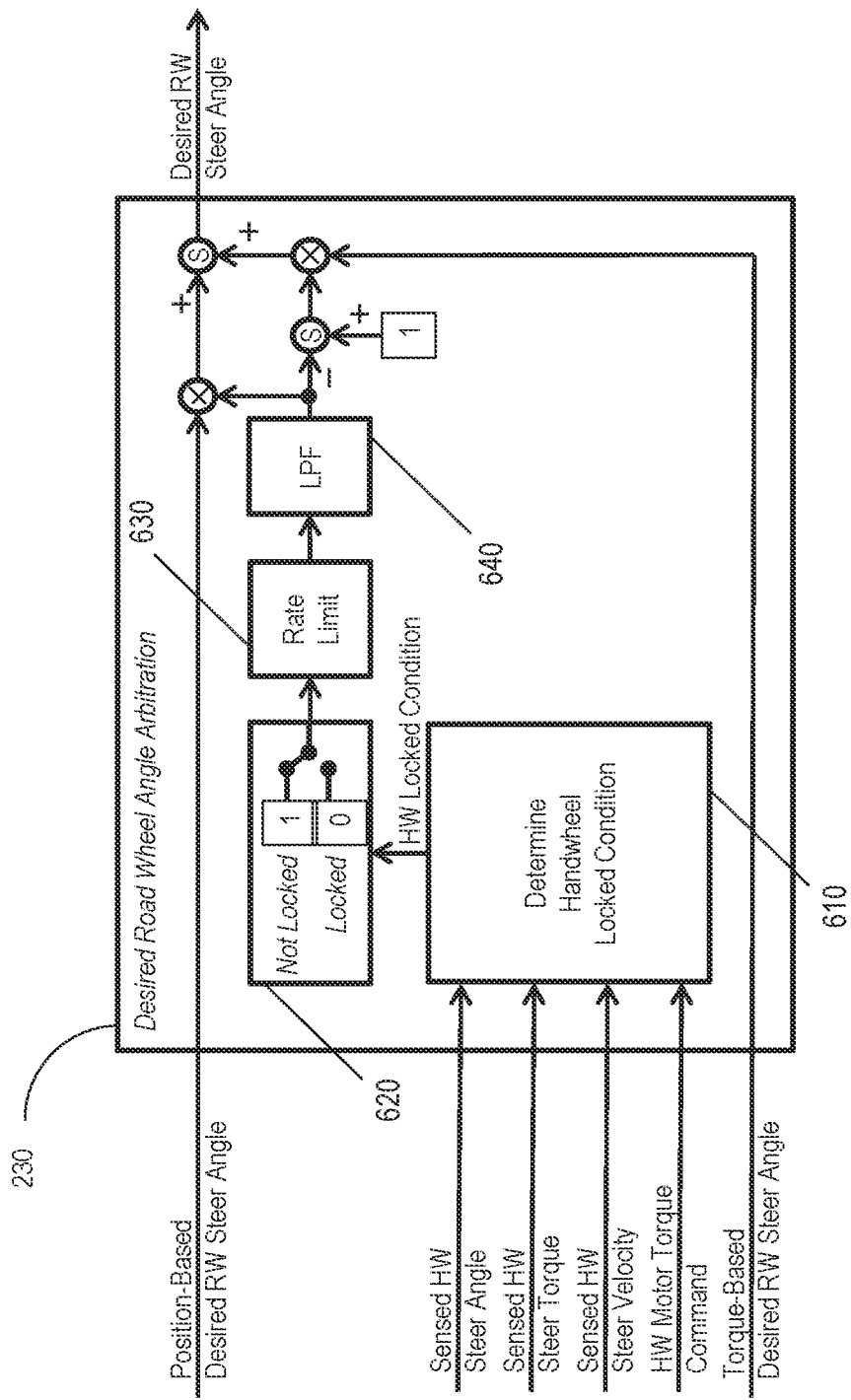
FIG. 6 generally illustrates a block diagram and an operational flow of an example arbitration module according to one or more embodiments.

FIG. 6 generally illustrates a block diagram and an operational flow of an example arbitration module according to one or more embodiments. The arbitration module 230 includes a handwheel lock detection module 610, a condition detector 620, a rate limiter 630, and a low-pass filter 640, among other components. The arbitration module 230 receives multiple inputs including the roadwheel positions computed by the roadwheel computation module 210 and the roadwheel computation module 220. Further, the inputs include handwheel angle, handwheel torque, and handwheel velocity. The inputs further include one or more commands from a closed loop motor control system that generates currents/voltages for adjusting the motor 124 of the roadwheel actuator 120.

The handwheel lock detection module 610 determines if the handwheel actuator motor 106 is in the locked state. The handwheel lock detection module 610 provides a handwheel lock condition signal to the condition detector 620. The handwheel lock condition indicates whether the handwheel actuator motor 106 is locked or not. The condition detector module 620 facilitates in the non-faulty operating case, when the handwheel actuator motor 106 is not locked, the position-based desired roadwheel angle is used from the roadwheel computation module 210. In the faulted case, when the handwheel actuator motor 106 is locked, the torque-based desired roadwheel angle is used from the roadwheel computation module 220. When a determination between the locked and unlocked condition changes, the desired roadwheel angle is a blend between the two calculated signals based on the output of the condition detector module 620.

For example, to allow for smooth transitions, the condition detector module 620 activates the rate limiter 630 and the low-pass filter (LPF) 640 to compute the blended roadwheel angle value. In one or more examples, the blended value is a sum of the roadwheel angle from the roadwheel computation module 210 and the roadwheel angle from the roadwheel computation module 220.

Further, in one or more examples, depending on what causes the handwheel actuator motor 106 to become stuck, the handwheel actuator motor 106 may become intermittently stuck and unstuck. Such behavior may cause challenges for a driver to maintain a desired path. To mitigate this, the controller 40 intentionally locks the handwheel actuator motor 106 in place after a locked condition has been determined, thus preventing intermittent transitions from the stuck and un-stuck states. For example, the controller locks the handwheel actuator motor 106 mechanically, such as using a lock-pin placed in a hole. Alternatively, or in addition, the controller 40 locks the handwheel actuator motor 106 by performing a position hold of the motor 106 for that current key cycle by generating a corresponding current/voltage command using the motor control system. The controller accordingly prevents the handwheel actuator motor 106 from being unstuck.

In some embodiments, a system for torque based directional control in a steer by wire steering system includes a torque sensor configured to measure handwheel torque, an amount of torque that is input via a handwheel of the steer by wire steering system. The system also includes a controller configured to determine a roadwheel angle corresponding to the handwheel torque. The system also includes a motor configured to adjust one or more roadwheels according to the roadwheel angle.

In some embodiments, the controller determines the roadwheel angle further based on a vehicle speed. In some embodiments, the controller determines the roadwheel angle corresponding to the handwheel torque in response to a handwheel actuator motor being locked. In some embodiments, the controller is further configured to determine the roadwheel angle corresponding to a handwheel angle in response to the handwheel actuator motor not being locked. In some embodiments, the controller comprises an arbitration module configured to: detect if a handwheel actuator motor is locked; in response to the handwheel actuator motor being locked, send the roadwheel angle corresponding to the handwheel torque to the actuator for adjusting the one or more roadwheels; and in response to the handwheel actuator motor not being locked, send a roadwheel angle corresponding to a handwheel angle to the actuator for adjusting the one or more roadwheels. In some embodiments, the arbitration module is further configured to, in response to the handwheel actuator motor being locked: compute a blended roadwheel angle using the roadwheel angle corresponding to the handwheel torque and the roadwheel angle corresponding to a handwheel angle; and send the blended roadwheel angle to the actuator for adjusting the one or more roadwheels. In some embodiments, the controller is further configured to prevent the handwheel actuator motor being unlocked during operation of the system by locking the handwheel actuator motor.

In some embodiments, a steering system includes a handwheel and a torque sensor configured to measure handwheel torque, an amount of torque that is input via the handwheel of the steer by wire steering system. The steering system also includes a controller configured to determine a roadwheel angle corresponding to the handwheel torque and a motor configured to adjust one or more roadwheels according to the roadwheel angle.

In some embodiments, the controller determines the roadwheel angle further based on a vehicle speed. In some embodiments, the controller determines the roadwheel angle corresponding to the handwheel torque in response to a handwheel actuator motor being locked. In some embodiments, the controller is further configured to determine the roadwheel angle corresponding to a handwheel angle in response to the handwheel actuator motor not being locked. In some embodiments, the controller comprises an arbitration module configured to: detect if a handwheel actuator motor is locked; in response to the handwheel actuator motor being locked, send the roadwheel angle corresponding to the handwheel torque to the actuator for adjusting the one or more roadwheels; and, in response to the handwheel actuator motor not being locked, send a roadwheel angle corresponding to a handwheel angle to the actuator for adjusting the one or more roadwheels. In some embodiments, the arbitration module is further configured to, in response to the handwheel actuator motor being locked: compute a blended roadwheel angle using the roadwheel angle corresponding to the handwheel torque and the roadwheel angle corresponding to a handwheel angle; and send the blended roadwheel angle to the actuator for adjusting the one or more roadwheels. In some embodiments, the controller is further configured to prevent the handwheel actuator motor being unlocked during operation of the steering system by locking the handwheel actuator motor.

In some embodiments, a method for torque based directional control in a steer by wire steering system includes measuring, by a torque sensor, a handwheel torque, which is an amount of torque that is input via the handwheel of the steer by wire steering system. The method also includes determining, by a controller, a roadwheel angle corresponding to the handwheel torque. The method also includes adjusting, by a motor, one or more roadwheels according to the roadwheel angle.

In some embodiments, the method also includes, determining, by the controller, the roadwheel angle corresponding to the handwheel torque in response to a handwheel actuator motor being locked. In some embodiments, the method also includes determining, by the controller, the roadwheel angle corresponding to a handwheel angle in response to the handwheel actuator motor not being locked. In some embodiments, determining the roadwheel angle comprises: receiving a signal indicating whether a handwheel actuator motor is locked: in response to the handwheel actuator motor being locked, sending the roadwheel angle corresponding to the handwheel torque to the actuator for adjusting the one or more roadwheels; and, in response to the handwheel actuator motor not being locked, sending a roadwheel angle corresponding to a handwheel angle to the actuator for adjusting the one or more roadwheels. In some embodiments, the method also includes, in response to the handwheel actuator motor being locked: computing a blended roadwheel angle using the roadwheel angle corresponding to the handwheel torque and the roadwheel angle corresponding to a handwheel angle; and sending the blended roadwheel angle to the actuator for adjusting the one or more roadwheels. In some embodiments, the method also includes preventing, by the controller, the handwheel actuator motor from being unlocked by locking the handwheel actuator motor.

In some embodiments, a system for vehicle steering control includes a processor and a memory. The memory includes instructions that, when executed by the processor, cause the processor to: receive a sensed handwheel angle corresponding to a position of a handwheel; receive a sensed handwheel toque value indicating an amount of torque applied by an operator on the handwheel; in response to a determination that the handwheel motor is in an unlocked condition, generate a roadwheel angle based on the sensed handwheel angle and a vehicle speed; and in response to a determination that the handwheel motor is in a locked condition: generate the roadwheel angle based on the sensed handwheel torque value and the vehicle speed; and, in response to a determination that the locked condition of the handwheel motor is an intermittent condition, maintain the handwheel motor in the locked condition.

In some embodiments, the instructions further cause the processor to, in response to a determination that the locked condition of the handwheel motor is not an intermittent condition, generate, responsive to a change in handwheel motor from the locked condition to the unlocked condition, an updated roadwheel angle based on the sensed handwheel angle, the sensed handwheel torque value, and the vehicle speed. In some embodiments, the instructions further cause the processor to, in response to a determination that the handwheel motor is locked the locked condition, selectively control one or more roadwheels based on the roadwheel angle. In some embodiments, the instructions further cause the processor to, in response to a determination that the handwheel motor is in the unlocked condition, selectively control one or more roadwheels based on the roadwheel angle. In some embodiments, the instructions further cause the processor to, in response to a determination that the handwheel motor is in the locked condition, generate a blended roadwheel angle using the roadwheel angle corresponding to the handwheel torque and the roadwheel angle corresponding to the sensed handwheel angle. In some embodiments, the instructions further cause the processor to selectively control one or more roadwheels based on the blended roadwheel angle. In some embodiments, the handwheel is associated with a steer-by-wire steering system.

In some embodiments, a vehicle steering control method includes receiving a sensed handwheel angle corresponding to a position of a handwheel and receiving a sensed handwheel toque value indicating an amount of torque applied by an operator on the handwheel. The method also includes, in response to a determination that the handwheel motor is in an unlocked condition, generating a roadwheel angle based on the sensed handwheel angle and a vehicle speed. The method also includes, in response to a determination that the handwheel motor is in a locked condition generating the roadwheel angle based on the sensed handwheel torque value and the vehicle speed and, in response to a determination that the locked condition of the handwheel motor is an intermittent condition, maintaining the handwheel motor in the locked condition.

In some embodiments, the method also includes, in response to a determination that the locked condition of the handwheel motor is not an intermittent condition, generating, responsive to a change in handwheel motor from the locked condition to the unlocked condition, an updated roadwheel angle based on the sensed handwheel angle, the sensed handwheel torque value, and the vehicle speed. In some embodiments, the method also includes, in response to a determination that the handwheel motor is locked the locked condition, selectively controlling one or more roadwheels based on the roadwheel angle. In some embodiments, the method also includes, in response to a determination that the handwheel motor is in the unlocked condition, selectively controlling one or more roadwheels based on the roadwheel angle. In some embodiments, the method also includes, in response to a determination that the handwheel motor is in the locked condition, generating a blended roadwheel angle using the roadwheel angle corresponding to the handwheel torque and the roadwheel angle corresponding to the sensed handwheel angle. In some embodiments, the method also includes selectively controlling one or more roadwheels based on the blended roadwheel angle. In some embodiments, the handwheel is associated with a steer-by-wire steering system.

In some embodiments, an apparatus for vehicle steering control includes a processor and a memory. The method includes instructions that, when executed by the processor, cause the processor to: receive a vehicle speed; receive a sensed handwheel toque value indicating an amount of torque applied by an operator on a handwheel; and, in response to a determination that a handwheel motor associated with the handwheel is in a locked condition, generate a roadwheel angle based on the sensed handwheel torque value and the vehicle speed and, in response to a determination that the locked condition of the handwheel motor is an intermittent condition, maintain the handwheel motor in the locked condition.

In some embodiments, the instructions further cause the processor to, in response to a determination that the locked condition of the handwheel motor is not an intermittent condition, generate, responsive to a change in handwheel motor from the locked condition to the unlocked condition, an updated roadwheel angle based on a sensed handwheel angle, the sensed handwheel torque value, and the vehicle speed. In some embodiments, the instructions further cause the processor to, in response to a determination that the handwheel motor is locked the locked condition, selectively control one or more roadwheels based on the roadwheel angle. In some embodiments, the instructions further cause the processor to, in response to a determination that the handwheel motor is in the locked condition, generate a blended roadwheel angle using the roadwheel angle corresponding to the handwheel torque and a roadwheel angle corresponding to a sensed handwheel angle. In some embodiments, the instructions further cause the processor to selectively control one or more roadwheels based on the blended roadwheel angle. In some embodiments, the handwheel is associated with a steer-by-wire steering system.

The technical solutions described herein address the technical challenges in steering systems, particularly steer by wire steering systems, of handwheel actuator motor being locked/stuck (cannot rotate). Such a locked motor prevents a driver from moving the steering wheel, causing loss of directional control. The technical solutions described herein address the technical challenges by determining desired vehicle heading based on at least two methods, using a steering angle (unlocked state), and using a steering torque (locked motor state). The technical solutions facilitate arbitrating between the two methods for determining desired vehicle heading, based on the locked condition of the motor. Further, for smooth transitions between the locked and unlocked state, the technical solutions facilitate blending the desired vehicle heading computed using the two (or more) methods. Further yet, the technical solutions described herein maintain the locked state of the handwheel actuator motor, once the motor has been locked to prevent intermittent locking and unlocking of the motor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for vehicle steering control, the system comprising:
   a processor; and
   a memory including instructions that, when executed by the processor, cause the processor to:
      receive a sensed handwheel angle corresponding to a position of a handwheel;
      receive a sensed handwheel torque value indicating an amount of torque applied by an operator on the handwheel;
      generate a first roadwheel angle based on the sensed handwheel angle and a vehicle speed;
      generate a second roadwheel angle based on the sensed handwheel torque value and the vehicle speed; and
      in response to a determination that a handwheel motor is in an unlocked condition, selectively control one or more roadwheels based on the first roadwheel angle;
      in response to a determination that the handwheel motor is in a locked condition, generate a blended roadwheel angle based on the first roadwheel angle and the second roadwheel angle and selectively control one or more roadwheels based on the blended roadwheel angle; and
      in response to a determination that the locked condition of the handwheel motor is an intermittent condition, maintain the handwheel motor in the locked condition and restrict the handwheel motor from being in the unlocked condition, wherein the locked condition of the handwheel motor corresponds to a fault.

2. The system of claim 1, wherein the instructions further cause the processor to, in response to a determination that the locked condition of the handwheel motor is not an intermittent condition, generate, responsive to a change in handwheel motor from the locked condition to the unlocked condition, an updated roadwheel angle based on the sensed handwheel angle, the sensed handwheel torque value, and the vehicle speed.

3. The system of claim 1, wherein the handwheel is associated with a steer-by-wire steering system.

4. A vehicle steering control method comprising:

receiving a sensed handwheel angle corresponding to a position of a handwheel;

receiving a sensed handwheel torque value indicating an amount of torque applied by an operator on the handwheel;

generating a first roadwheel angle based on the sensed handwheel angle and a vehicle speed;

generating a second roadwheel angle based on the sensed handwheel torque value and the vehicle speed;

in response to a determination that a handwheel motor is in an unlocked condition, selectively controlling one or more roadwheels based on the first roadwheel angle;

in response to a determination that the handwheel motor is in a locked condition, generating a blended roadwheel angle based on the first roadwheel angle and the second roadwheel angle; and in response to a determination that the locked condition of the handwheel motor is an intermittent condition, maintaining the handwheel motor in the locked condition and restrict the handwheel motor from being in the unlocked condition wherein the locked condition of the handwheel motor corresponds to a fault.

5. The method of claim 4, further comprising, in response to a determination that the locked condition of the handwheel motor is not an intermittent condition, generating, responsive to a change in handwheel motor from the locked condition to the unlocked condition, an updated roadwheel angle based on the sensed handwheel angle, the sensed handwheel torque value, and the vehicle speed.

6. The method of claim 4, wherein the handwheel is associated with a steer-by-wire steering system.

7. An apparatus for vehicle steering control, the apparatus comprising:

a processor; and a memory including instructions that, when executed by the processor, cause the processor to:

receive a vehicle speed;

receive a sensed handwheel torque value indicating an amount of torque applied by an operator on a handwheel;

generate a first roadwheel angle based on a sensed handwheel angle and the vehicle speed;

generate a second roadwheel angle based on the sensed handwheel torque value and the vehicle speed;

in response to a determination that a handwheel is in an unlocked condition, selectively control one or more roadwheels based on the first roadwheel angle;

in response to a determination that the handwheel is in a locked condition, selectively control the one or more roadwheels based on a blended roadwheel angle, wherein the blended roadwheel angle is based on the first roadwheel angle and the second roadwheel angle; and in response to a determination that the locked condition of the handwheel motor is an intermittent condition, maintain the handwheel motor in the locked condition and restrict the handwheel motor from being in the unlocked condition, wherein the locked condition of the handwheel motor corresponds to a fault.

8. The apparatus of claim 7, wherein the instructions further cause the processor to, in response to a determination that the locked condition of the handwheel motor is not an intermittent condition, generate, responsive to a change in handwheel motor from the locked condition to an unlocked condition, an updated roadwheel angle based on a sensed handwheel angle, the sensed handwheel torque value, and the vehicle speed.

9. The apparatus of claim 7, wherein the handwheel is associated with a steer-by-wire steering system.

* * * * *